United States Patent
Camp et al.

(10) Patent No.: US 10,592,110 B2
(45) Date of Patent: Mar. 17, 2020

(54) TECHNIQUES FOR DYNAMICALLY ADJUSTING OVER-PROVISIONING SPACE OF A FLASH CONTROLLER BASED ON WORKLOAD CHARACTERISTICS

(71) Applicant: INTERNATIONAL BUSINESS MACHINES CORPORATION, Armonk, NY (US)

(72) Inventors: Charles J. Camp, Sugar Land, TX (US); Timothy J. Fisher, Cypress, TX (US); Aaron D. Fry, Richmond, TX (US); Nikolas Ioannou, Zurich (CH); Thomas Parnell, Zurich (CH); Roman A. Pletka, Zurich (CH); Sasa Tomic, Kilchberg (CH)

(73) Assignee: International Business Machines Corporation, Armonk, NY (US)

(*) Notice: Subject to any disclaimer, the term of this patent is extended or adjusted under 35 U.S.C. 154(b) by 123 days.

(21) Appl. No.: 15/047,929

(22) Filed: Feb. 19, 2016

(65) Prior Publication Data
US 2017/0242592 A1    Aug. 24, 2017

(51) Int. Cl.
G06F 3/06    (2006.01)
G06F 12/02   (2006.01)
G06F 11/00   (2006.01)

(52) U.S. Cl.
CPC .......... *G06F 3/0605* (2013.01); *G06F 3/0608* (2013.01); *G06F 3/0616* (2013.01); *G06F 3/0631* (2013.01); *G06F 3/0653* (2013.01); *G06F 3/0688* (2013.01); *G06F 11/00* (2013.01); *G06F 12/0246* (2013.01); *G06F 2212/1036* (2013.01); *G06F 2212/1044* (2013.01); *G06F 2212/1052* (2013.01); *G06F 2212/214* (2013.01); *G06F 2212/262* (2013.01); *G06F 2212/401* (2013.01); *G06F 2212/7201* (2013.01); *G06F 2212/7202* (2013.01); *G06F 2212/7205* (2013.01); *G06F 2212/7206* (2013.01); *G06F 2212/7208* (2013.01)

(58) Field of Classification Search
None
See application file for complete search history.

(56) References Cited

U.S. PATENT DOCUMENTS

| | | | |
|---|---|---|---|
| 8,479,080 B1 * | 7/2013 | Shalvi | G06F 11/10 365/185.09 |
| 8,615,499 B2 | 8/2013 | Chambliss et al. | |
| 8,880,788 B1 | 11/2014 | Sundaram et al. | |

(Continued)

OTHER PUBLICATIONS

Disclosed Anonymously (Feb. 2014). Method and System for Tailoring Over-provisioning of Flash-Based Storage Systems based on User Requirements. Ip.Com, Doi: 000235024. See p. 1.

(Continued)

*Primary Examiner* — Jared I Rutz
*Assistant Examiner* — Marwan Ayash
(74) *Attorney, Agent, or Firm* — Michael R. Long; Wenjie Li

(57) ABSTRACT

A technique for adapting over-provisioning space in a storage system includes determining one or more workload characteristics in the storage system. Over-provisioning space in the storage system is then adjusted to achieve a target write amplification for the storage system, based on the workload characteristics.

9 Claims, 14 Drawing Sheets

(56) References Cited

U.S. PATENT DOCUMENTS

| | | | |
|---|---|---|---|
| 9,141,532 B2* | 9/2015 | Horn | G06F 12/0246 |
| 2011/0264843 A1 | 10/2011 | Haines et al. | |
| 2012/0303873 A1* | 11/2012 | Nguyen | G06F 3/0616 |
| | | | 711/103 |
| 2013/0198148 A1* | 8/2013 | Chambliss | G06F 17/30156 |
| | | | 707/692 |
| 2014/0040639 A1 | 2/2014 | Raam | |
| 2014/0181369 A1* | 6/2014 | Horn | G06F 12/0246 |
| | | | 711/103 |
| 2014/0281126 A1* | 9/2014 | Bleyer | G06F 3/061 |
| | | | 711/103 |
| 2014/0281167 A1 | 9/2014 | Danilak et al. | |
| 2014/0310494 A1* | 10/2014 | Higgins | G11C 16/349 |
| | | | 711/167 |
| 2015/0134926 A1 | 1/2015 | Huang et al. | |

OTHER PUBLICATIONS

Disclosed Anonymously (Nov. 2011). Paired storage devices utilizing ports inside of a SAS connector to create a tightly coupled hybrid device. ip.com, Doi: 000212613. See p. 2.

Oh, Y., Choi, J., Lee, D. & Noh, S. H. (Feb. 2012). Caching less for better performance: balancing cache size and update cost of flash memory cache in hybrid storage systems. In FAST (vol. 12), pp. 1-14. See pp. 1 & 9.

* cited by examiner

TECHNIQUES FOR DYNAMICALLY ADJUSTING OVER-PROVISIONING SPACE OF A FLASH CONTROLLER BASED ON WORKLOAD CHARACTERISTICS

BACKGROUND OF THE INVENTION

The present disclosure is generally directed to dynamically adjusting over-provisioning space of a flash controller and, more specifically, to techniques for dynamically adjusting over-provisioning space of a flash controller based on workload characteristics (e.g., read/write ratio, write amplification, and write access distribution).

NAND flash memory is an electrically programmable and erasable non-volatile memory technology that stores one or more bits of data per memory cell as a charge on the floating gate of a transistor or a similar charge trap structure. In a typical implementation, a NAND flash memory array is organized in blocks (also referred to as "erase blocks") of physical memory, each of which includes multiple physical pages each in turn containing a multiplicity of memory cells. By virtue of the arrangement of the word and bit lines utilized to access memory cells, flash memory arrays can generally be programmed on a page basis, but are erased on a block basis.

As is known in the art, blocks of NAND flash memory must be erased prior to being programmed with new data. A block of NAND flash memory cells is erased by applying a high positive erase voltage pulse to the p-well bulk area of the selected block and by biasing to ground all of the word lines of the memory cells to be erased. Application of the erase pulse promotes tunneling of electrons off of the floating gates of the memory cells biased to ground to give them a net positive charge and thus transition the voltage thresholds of the memory cells toward the erased state. Each erase pulse is generally followed by an erase verify operation that reads the erase block to determine whether the erase operation was successful, for example, by verifying that less than a threshold number of memory cells in the erase block have been unsuccessfully erased. In general, erase pulses continue to be applied to the erase block until the erase verify operation succeeds or until a predetermined number of erase pulses have been used (i.e., the erase pulse budget is exhausted).

A NAND flash memory cell can be programmed by applying a positive high program voltage to the word line of the memory cell to be programmed and by applying an intermediate pass voltage to the memory cells in the same string in which programming is to be inhibited. Application of the program voltage causes tunneling of electrons onto the floating gate to change its state from an initial erased state to a programmed state having a net negative charge. Following programming, the programmed page is typically read in a read verify operation to ensure that the program operation was successful, for example, by verifying that less than a threshold number of memory cells in the programmed page contain bit errors. In general, program and read verify operations are applied to the page until the read verify operation succeeds or until a predetermined number of programming pulses have been used (i.e., the program pulse budget is exhausted).

Thin provisioning, in a shared-storage environment, facilitates optimizing available storage utilization by enabling over-allocation or over-subscription. Thin provisioning relies on on-demand allocation of storage blocks versus the conventional approach of allocating all storage blocks up-front. In general, thin provisioning helps avoid poor utilization rates in which large storage pools are allocated but remain unused.

In computer science, garbage collection (GC) is a form of automatic memory management in which a garbage collector attempts to reclaim garbage (memory occupied by objects that are no longer in use by a program). With respect to a flash memory, garbage collection involves reading and re-writing data to the flash memory. Data is written to the flash memory in units called pages. However, as noted above, flash memory can only be erased in larger units called blocks (made up of multiple pages). If the data in some of the pages of the block are no longer needed (also called stale, invalid, or dirty pages), only the pages with good data in that block are read and re-written into another previously erased empty block.

Because a flash memory must be erased before the flash memory can be re-written, garbage collection results in re-writing user data and metadata more than once. That is, re-writing some data requires an already used portion of flash memory to be read, updated, and written to a new location, together with initially erasing the new location if the new location was previously used at some point in time. Due to the way flash memory works, much larger portions of flash memory must be erased and rewritten than is usually required by the amount of new data. This multiplying effect (known as write amplification) increases the number of writes required over the life of a flash memory and shortens the time the flash memory can reliably operate.

BRIEF SUMMARY

A technique for adapting over-provisioning space in a storage system includes determining workload characteristics (e.g., dynamic read/write ratio, dynamic write amplification, and dynamic write access distribution) in the storage system. Over-provisioning space in the storage system is then adjusted to achieve a target write amplification for the storage system, based on the workload characteristics.

DETAILED DESCRIPTION

Figure 1A:
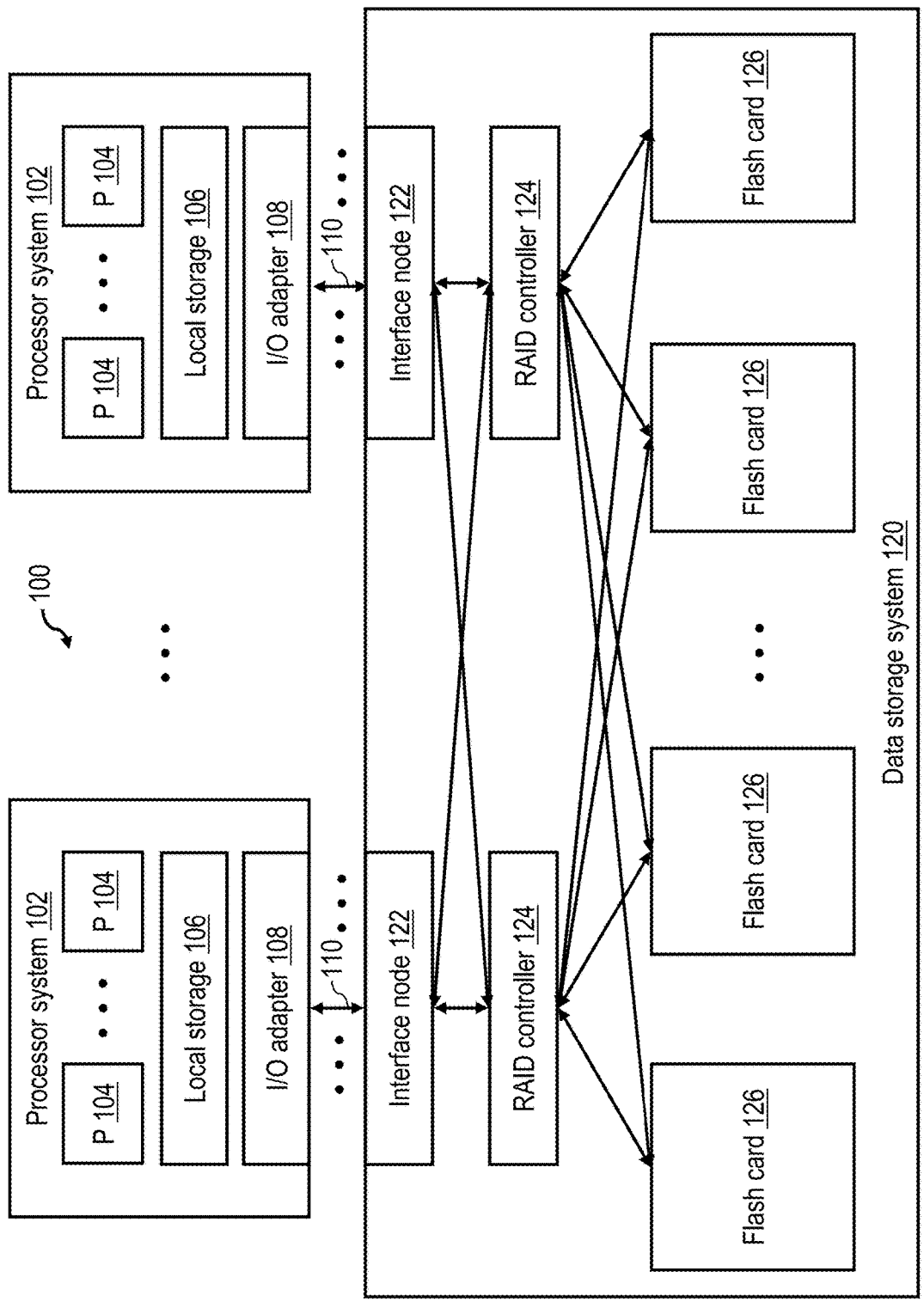
FIG. 1A is a high level block diagram of a data processing environment in accordance with one embodiment.

In general, performance characteristics of NAND flash-based Solid State Disks (SSDs) are fundamentally different from traditional hard disk drives (HDDs). Data stored in an SSD is typically organized in 4, 8, or 16 kilobyte (kB) page sizes. Page read operations for SSDs are typically one order of magnitude faster than write operations and latency neither depends on a current location nor a previous location of an operation. Moreover, memory locations in NAND flash-based SSDs must be erased prior to being written. The size of a minimal physical unit that can be erased (i.e., a flash block) is typically 256 or 512 pages. A block-erase operation takes approximately one order of magnitude more time than a page program operation. Due to these intrinsic properties, NAND flash-based SSDs typically write data out-of-place, which requires maintaining a mapping (translation) layer from logical-to-physical addresses usually referred to as a logical-to-physical table (LPT).

As flash chips, blocks, or pages may experience errors or completely fail (due to limited endurance or other reasons), redundancy has been implemented within flash pages (e.g., in the form of error correcting codes (ECCs), such as Bose-Chaudhuri-Hocquenghem (BCH) codes) and across flash chips (e.g., employing RAID-5 or RAID-6 like approaches). While the addition of ECC in pages is relatively straightforward, the organization of flash blocks into RAID-like stripes is more complex as individual blocks have to be retired over time which requires reorganization of the stripes or shrinking the capacity of the stripes. As the organization of stripes in conjunction with the LPT define the placement of data, SSDs have utilized a so-called log-structured array (LSA) architecture to facilitate out-of-place writes.

Garbage collection in the context of flash controllers refers to the process of identifying blocks suitable for erasing, relocating valid data from the blocks to be erased, and erasing the blocks to prepare the blocks for future writes. While garbage collection is necessary due to the physical characteristics of the NAND flash-based storage, garbage collection causes write amplification. A physical block is a minimum unit that can be erased on NAND flash to prepare the physical block for writing user data. However, for many different reasons, a typical garbage collection unit may include multiple physical blocks of flash memory. For example, multiple flash blocks may be grouped together in a RAID stripe. As noted above, RAID schemes generally improve reliability and reduce the probability of data loss. As RAID parity is computed against all data in a RAID stripe, individual blocks in a RAID stripe cannot be erased individually. That is, in various embodiments a complete RAID stripe is garbage collected and erased as a single unit.

It is common for blocks from different dies and/or flash channels to be grouped together, such that all blocks from a same group can be read or written in parallel to increase overall bandwidth. It is also possible to compose RAID stripes using blocks from different flash channels that can be accessed in parallel. Due to block grouping schemes, a minimum garbage collection unit is often significantly larger than a single erase block. As used herein, a Logical Erase Block (LEB) refers to a garbage collection unit that may include one or more erase blocks.

In the context of storage systems, data reduction refers to techniques that reduce the amount of data that needs to be stored in a storage medium. Data compression and data deduplication are examples of data reduction techniques. Data compression refers to encoding information using fewer bits than an original representation of the information. Compression can be either lossless or lossy. In the context of storage systems lossless data compression is employed. Lossless data compression reduces bits by identifying and eliminating statistical redundancy with no information loss. By compressing data, storage capacity can be saved and the transfer of (uncompressed) data can be accelerated. Data deduplication is a specialized data reduction technique for eliminating duplicate copies of repeating data and is used to improve storage utilization. During the deduplication process unique chunks of data, or byte patterns, are identified and stored. Other chunks are then compared to the stored chunks and whenever a match occurs, the redundant chunk is replaced with a reference that points to the stored chunk and the redundant chunk is not stored. Given that the same byte pattern may occur several times, the amount of stored data can be reduced significantly.

The present disclosure is directed to a flash controller that writes data out-of-place in a log-structured manner (maintaining a logical-to-physical mapping) and that implements a garbage collector to reclaim blocks of physical space. The present disclosure is further directed to a flash controller that compresses user data before writing the user data to flash and that implements thin provisioning to support data compression. To accommodate garbage collection the total number of LEBs has to be greater than the number of LEBs exposed to a user. Spare LEBs that are essential for garbage collection are referred to herein as over-provisioning space. The endurance and steady state write-performance of a flash controller under a non-sequential workload is tightly connected to the amount of spare or unused space compared to the amount of space used by the workload. More specifically, the endurance and steady state write-performance of a flash controller is directly correlated with write amplification.

As is known, the amount of data written to flash (DataWrittenToFlash) is equal to the amount of data written by a user (DataWrittenByUser) plus the amount of data relocated (DataRelocated). Write amplification is then equal to the amount of data written to flash (DataWrittenToFlash) divided by the amount of data written by a user (DataWrittenByUser). According to one or more embodiments of the present disclosure, an over-provisioning space is dynamically adjusted, based on one or more workload characteristics and/or a data reduction ratio (e.g., an average compression ratio), in order to provide more user capacity without adversely affecting user access performance.

Many flash vendors have conventionally picked one or more target workloads and chose over-provisioning space for their solutions based on various factors, such as performance, endurance, and/or price point. In general, over-provisioning directly corresponds to an expected write amplification data point. In the presence of data compression, however, statically choosing an over-provisioning space size may be suboptimal, as write amplification is reduced by a compression ratio.

In conventional storage systems that have implemented a static over-provisioning percentage, the static over-provisioning percentage has been set at design-time, based on the worst-case performance analysis (i.e., write amplification for uniform random workloads and no compression at maximum logical space utilization). The reasons for setting an over-provisioning percentage to a relatively large value have included that many workloads would experience a relatively high write amplification at a lower over-provisioning percentage (and thus poor performance) and DRAM available for LPT tables has been limited. Setting an over-provisioning percentage to a relatively small value provides more user space and for workloads with lower write amplification (e.g., sequential or heavily skewed workloads that have a write amplification close to 1) a lower over-provisioning percentage may be adequate.

In general, what should be guaranteed is an observed performance and not an over-provisioning percentage. By implementing adaptive over-provisioning certain observed performance can be guaranteed. Over-provisioned space may be used for garbage collection to facilitate selecting a stripe with a relatively large amount of unused space (many invalid pages) and relocating all valid data (which contributes to write amplification) from the selected stripe. The stripe may then be erased and disassembled into blocks, whose availability is indicated by placement into ready-to-use (RTU) queues. As is known, write amplification can be reduced by selecting stripes with a relatively small amount of valid data. More free space in a stripe indicates a higher likelihood of finding stripes with a relatively small amount of valid data. Without thin provisioning and using static over-provisioning an LPT may not be able to map an entire physical space. However, with static over-provisioning space may be guaranteed to be available for garbage collection. In storage systems that implement thin provisioning, an LPT may map a virtual space that is larger (e.g., four times larger) than a physical space.

While a user may be able to map an entire physical space, over-provisioned space may not be guaranteed to be available for garbage collection. In general, remaining free physical space has conventionally been re-calculated every 'X' user writes and when remaining free space fell below a threshold, a flash controller reported that no free space was available (even though some reserved amount of free space was still available). In general, different workloads need different over-provisioning percentages to achieve the same write amplification. For example, uniform random workloads need relatively high over-provisioning, weakly skewed workloads need lower over-provisioning, highly skewed workloads need relatively small over-provisioning, and sequential writes need almost zero over-provisioning. In addition, the usage of trim commands further helps to reduce write amplification. In general, dynamically reducing an over-provisioning percentage does not adversely impact performance for at least some workloads.

As previously mentioned, it is more desirable to guarantee performance of user accesses than an over-provisioning percentage. Write amplification directly affects a user-observed performance of a storage system. Thin provisioning facilitates adapting the over-provisioning percentage to the workload. One possible implementation is to monitor for a threshold level (e.g., 20 percent) of free space. When free space approaches the threshold level a low-space-warning may be sent to a user while normal storage system operation is continued (it should be appreciated that from that point on any write may fail). According to this embodiment, when the threshold level is approached a write amplification calculation is initiated and the write amplification is re-calculated every 'X' writes or 'Y' minutes while an over-provisioning percentage is decreased. If write amplification crosses a minimum threshold (target write amplification) an out-of-space error is sent to the user and writes are failed until enough space is freed. According to one or more embodiments, a workload is defined by workload characteristics (e.g., read/write ratio, write amplification, and data access pattern) and data reduction ratio (e.g., data compression ratio and/or data deduplication ratio). Fewer writes mean that fewer valid data blocks require relocation in a unit of time and in this case somewhat higher write amplification can be tolerated. In practice, this means that for read-dominated workloads a target write amplification can be increased without impacting performance.

With reference to the figures and with particular reference to FIG. 1A, there is illustrated a high level block diagram of an exemplary data processing environment 100 including a data storage system 120 that is configured to perform dynamic over-provisioning according to the present disclosure and having a non-volatile memory array as described further herein. As shown, data processing environment 100 includes one or more hosts, such as a processor system 102 having one or more processors 104 that process instructions and data. Processor system 102 may additionally include local storage 106 (e.g., DRAM or disks) that may store program code, operands, and/or execution results of the processing performed by processor(s) 104. In various embodiments, processor system 102 can be, for example, a mobile computing device (such as a smartphone or tablet), a laptop or desktop personal computer system, a server computer system (such as one of the POWER® series available from International Business Machines Corporation), or a mainframe computer system. Processor system 102 can also be an embedded processor system using various processors such as ARM®, POWER, Intel X86, or any other processor combined with memory caches, memory controllers, local storage, I/O bus hubs, etc.

Each processor system 102 further includes an input/output (I/O) adapter 108 that is coupled directly (i.e., without any intervening device) or indirectly (i.e., through at least one intermediate device) to a data storage system 120 via an I/O channel 110. In various embodiments, an I/O channel 110 may employ any one or a combination of known or future developed communication protocols, including, for example, Fibre Channel (FC), FC over Ethernet (FCoE), Internet Small Computer System Interface (iSCSI), Infini-Band, Transport Control Protocol/Internet Protocol (TCP/IP), Peripheral Component Interconnect Express (PCIe), etc. I/O operations (IOPs) communicated via I/O channel 110 include read IOPs by which a processor system 102 requests data from data storage system 120 and write IOPs by which a processor system 102 requests storage of data in data storage system 120.

In the illustrated embodiment, data storage system 120 includes multiple interface nodes 122 through which data storage system 120 receives and responds to IOPs via I/O channels 110. Each interface node 122 is coupled to each of multiple Redundant Array of Inexpensive Disks (RAID) controllers 124 in order to facilitate fault tolerance and load balancing. Each of RAID controllers 124 is in turn coupled (e.g., by a PCIe bus) to each of multiple flash cards 126 including, in this example, NAND flash storage media. In other embodiments, other lossy storage media can be employed.

Figure 1B:
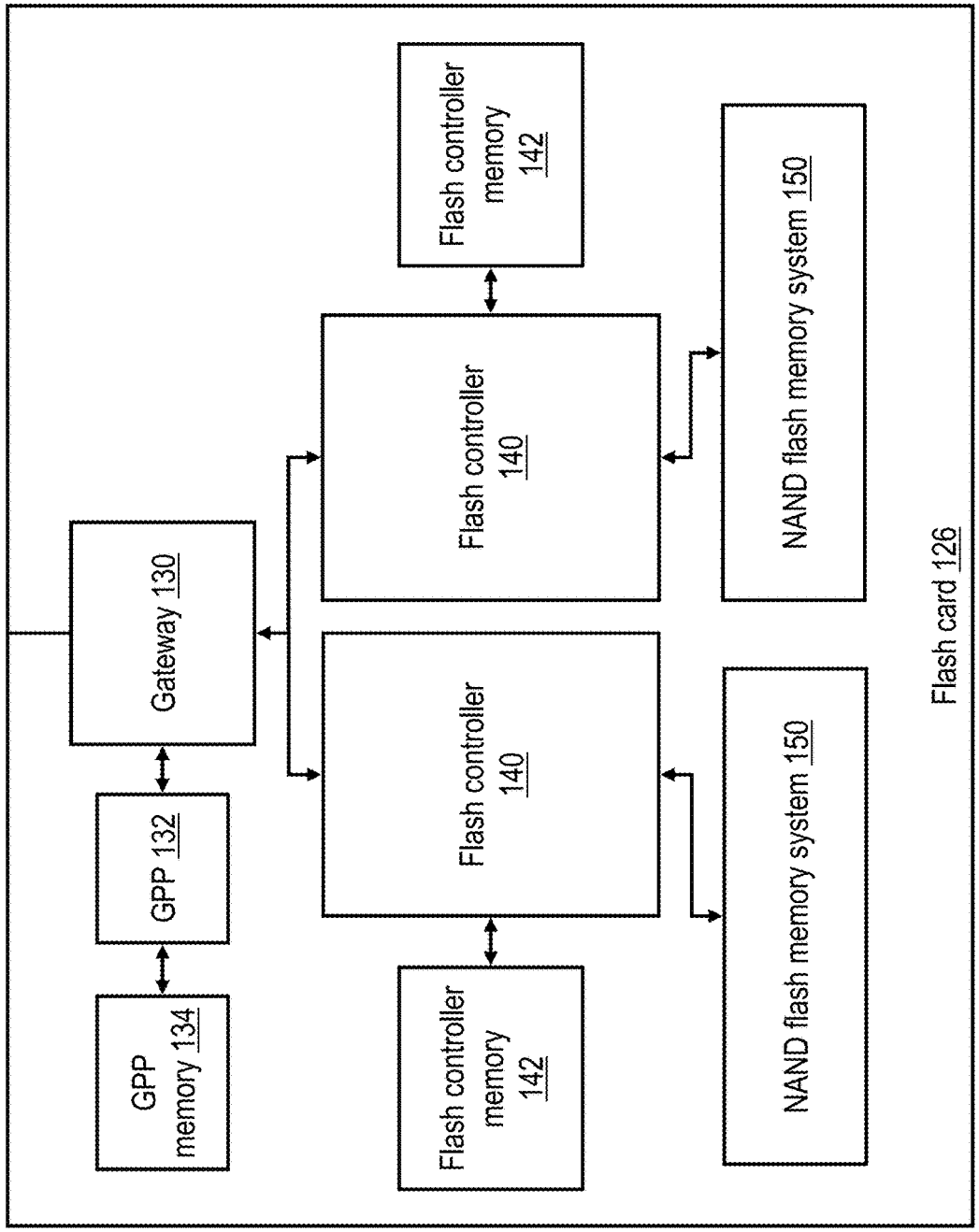
FIG. 1B is a more detailed block diagram of an exemplary flash card of the data storage system of FIG. 1A.

FIG. 1B depicts a more detailed block diagram of a flash card 126 of data storage system 120 of FIG. 1A. Flash card 126 includes a gateway 130 that serves as an interface between flash card 126 and RAID controllers 124. Gateway 130 is coupled to a general-purpose processor (GPP) 132, which can be configured (e.g., by program code) to perform various management functions, such as pre-processing of IOPs received by gateway 130 and/or to schedule servicing of the IOPs by flash card 126. GPP 132 is coupled to a GPP memory 134 (e.g., DRAM or Magneto-resistive Random Access Memory (MRAM)) that can conveniently buffer data created, referenced and/or modified by GPP 132 in the course of its processing.

Gateway 130 is further coupled to multiple flash controllers 140, each of which controls a respective NAND flash memory system 150. Flash controllers 140 can be implemented, for example, by an Application Specific Integrated Circuit (ASIC) or a Field Programmable Gate Array (FPGA)) having an associated flash controller memory 142 (e.g., DRAM). In embodiments in which flash controllers 140 are implemented with an FPGA, GPP 132 may program and configure flash controllers 140 during start-up of data storage system 120. After startup, in general operation flash controllers 140 receive read and write IOPs from gateway 130 that request to read data stored in NAND flash memory system 150 and/or to store data in NAND flash memory system 150. Flash controllers 140 service these IOPs, for example, by accessing NAND flash memory systems 150 to read or write the requested data from or into NAND flash memory systems 150 or by accessing one or more read and/or write caches (not illustrated in FIG. 1B) associated with NAND flash memory systems 150.

Flash controllers 140 implement a Flash Translation Layer (FTL) that provides logical-to-physical address translation to enable access to specific memory locations within NAND flash memory systems 150. In general, an IOP received by flash controller 140 from a host device, such as a processor system 102, contains the logical block address (LBA) at which the data is to be accessed (read or written) and, if a write IOP, the write data to be written to data storage system 120. The IOP may also specify the amount (or size) of the data to be accessed. Other information may also be communicated depending on the protocol and features supported by data storage system 120. As is known to those skilled in the art, NAND flash memory, such as that employed in NAND flash memory systems 150, is constrained by its construction such that the smallest granule of data that can be accessed by a read or write IOP is fixed at the size of a single flash memory page, for example, 16 kilobytes (kB). The LBA provided by the host device corresponds to a logical page within a logical address space, the logical page typically having a size of four (4) kilobytes. This logical page can be further compressed by flash controller 140 such that the physical data being written for a logical page can be significantly smaller than 4 kilobytes. As such, more than one logical page may be stored in a physical flash page. The FTL translates this LBA into a physical address assigned to a corresponding physical location in a NAND flash memory system 150.

Flash controllers 140 may perform address translation and/or store mappings between logical and physical addresses in a logical-to-physical translation data structure, such as a logical-to-physical translation (LPT) table, which may conveniently be stored in flash controller memory 142. An LPT table may also be configured to store compressed sizes of data pages stored in NAND flash memory system 150.

NAND flash memory systems 150 may take many forms in various embodiments. Referring now to FIGS. 2-5, there is depicted one exemplary arrangement of physical memory within a NAND flash memory system 150 in accordance with one exemplary embodiment.

Figure 2:
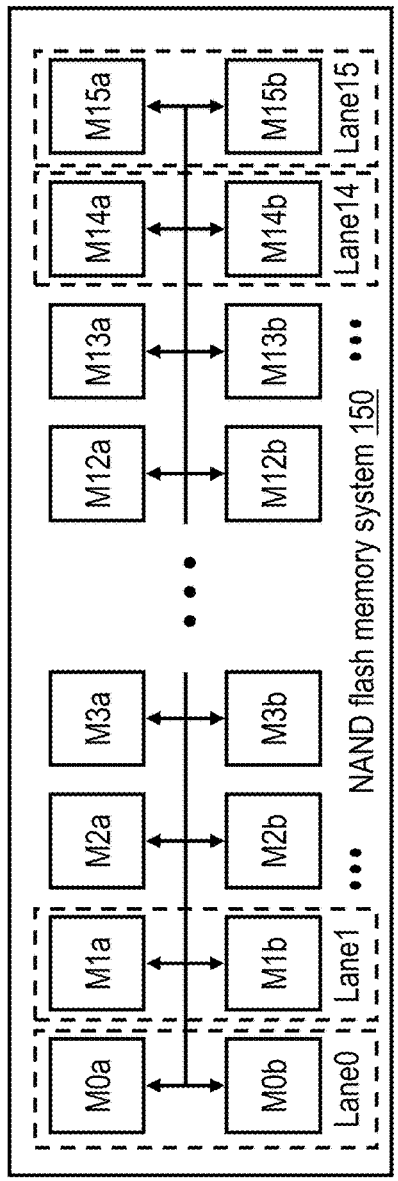
FIGS. 2-5 illustrate an exemplary arrangement of physical memory within a NAND flash memory system in accordance with the present disclosure.

As shown in FIG. 2, NAND flash memory system 150 may be formed from thirty-two (32) individually addressable NAND flash memory storage devices. In the illustrated example, each of the flash memory storage devices M0a-M15b takes the form of a board-mounted flash memory module capable of storing two or more bits per cell. Thus, flash memory modules may be implemented with Multi-Level Cell (MLC), Three Level Cell (TLC), or Quad Level Cell (QLC) memory. The thirty-two NAND flash memory modules are arranged in sixteen groups of two, (M0a, M0b) through (M15a, M15b). For purposes of the physical addressing scheme, each group of two modules forms a "lane," also sometimes referred to as a "channel," such that NAND flash memory system 150 includes sixteen channels or lanes (Lane0-Lane15).

In a preferred embodiment, each of the individual lanes has a respective associated bus coupling it to the associated flash controller 140. Thus, by directing its communications to one of the specific communication buses, flash controller 140 can direct its communications to one of the lanes of memory modules. Because each communication bus for a given lane is independent of the communication buses for the other lanes, a flash controller 140 can issue commands and send or receive data across the various communication buses at the same time, enabling the flash controller 140 to access the flash memory modules corresponding to the individual lanes at, or very nearly at, the same time.

Figure 3:
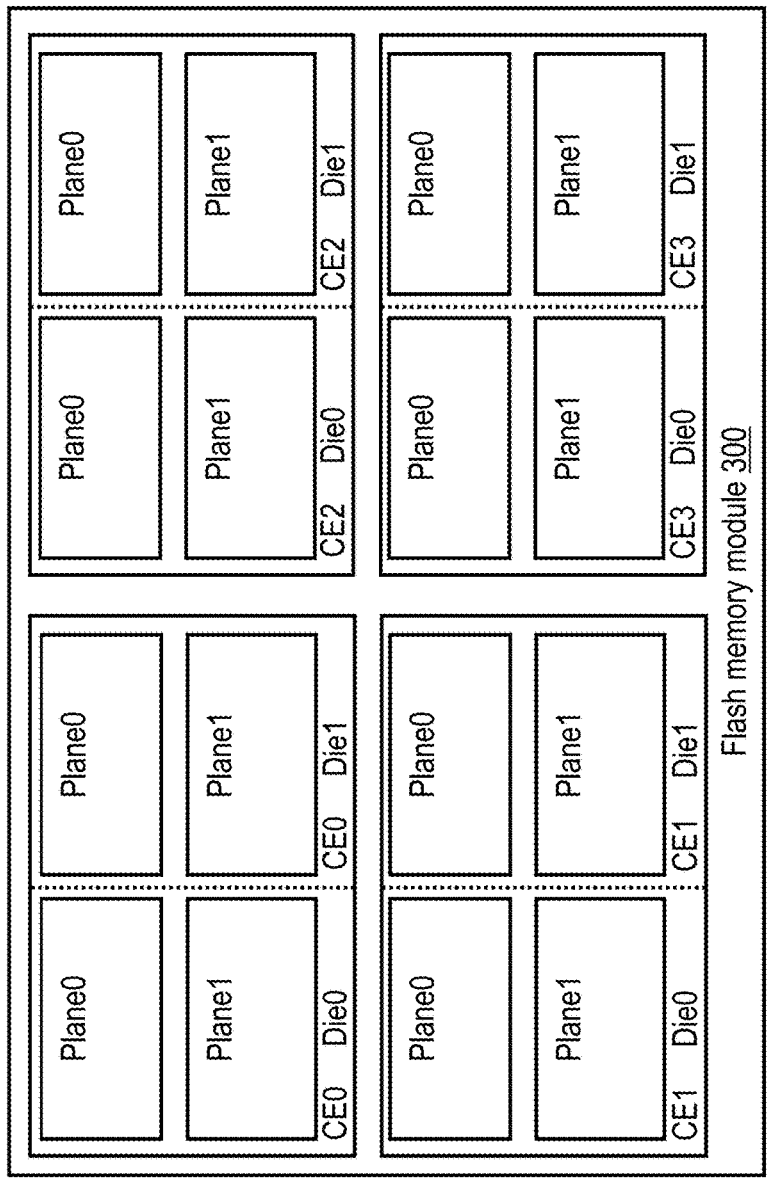

With reference now to FIG. 3, there is illustrated an exemplary embodiment of a flash memory module 300 that can be utilized to implement any of flash memory modules M0a-M15b of FIG. 2. As shown in FIG. 3, the physical storage locations provided by flash memory module 300 are further subdivided into physical locations that can be addressed and/or identified through Chip Enables (CEs). In the example of FIG. 3, the physical memory of each flash memory chip 300 is divided into four Chip Enables (CE0, CE1, CE2 and CE3), each having a respective CE line that is asserted by flash controller 140 to enable access to or from the physical memory locations within the corresponding CE. Each CE is in turn subdivided into multiple dice (e.g., Die0 and Die1) each having two planes (e.g., Plane0 and Plane1). Each plane represents a collection of blocks (described below) that, because of the physical layout of the flash memory chips, are physically associated with one another and that utilize common circuitry (e.g., I/O buffers) for the performance of various operations, such as read and write operations.

Figure 4:
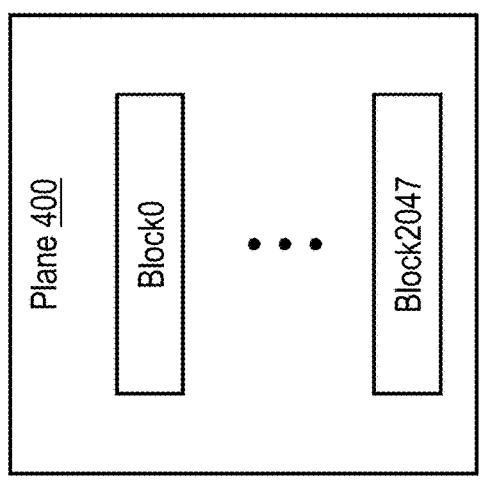
Figure 5:
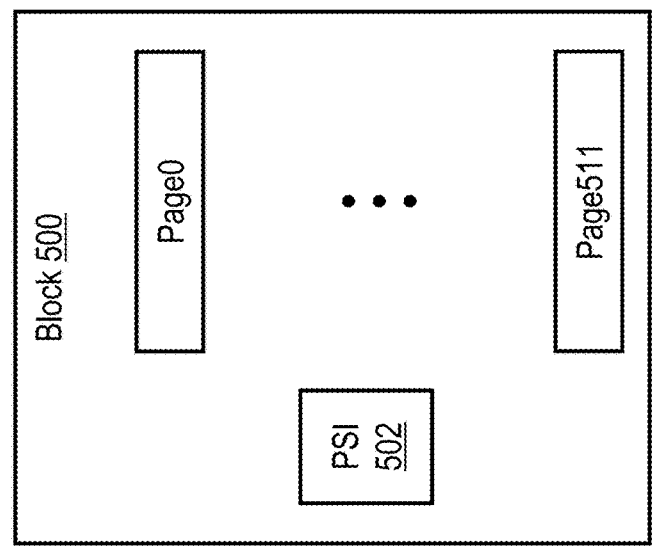

As further shown in FIGS. 4-5, an exemplary plane 400, which can be utilized to implement any of the planes within flash memory module 300 of FIG. 3, includes, for example, 1024 or 2048 blocks of physical memory. Note that manufacturers often add some additional blocks as some blocks might fail early. In general, a block is a collection of physical pages that are associated with one another, typically in a physical manner. This association is such that a block is defined to be the smallest granularity of physical storage locations that can be erased within NAND flash memory system 150. In the embodiment of FIG. 5, each block 500 includes, for example, 256 or 512 physical pages, where a physical page is defined to be the smallest individually addressable data unit for read and write access. In the exemplary system, each physical page of data has a common capacity (e.g., 16 kB) for data storage plus additional storage for metadata described in more detail below. Thus, data is written into or read from NAND flash memory system 150 on a page-by-page basis, but erased on a block-by-block basis.

Because NAND flash memory system 150 is implemented in a memory technology supporting multiple bits per cell, it is common for multiple physical pages of each block 500 to be implemented in the same set of memory cells. For example, assuming 512 physical pages per block 500 as shown in FIG. 5 and two bits per memory cell (i.e., NAND flash memory 150 is implemented in MLC memory), Page0 through Page255 (the lower pages) can be implemented utilizing the first bit of a given set of memory cells and Page256 through Page511 (the upper pages) can be implemented utilizing the second bit of the given set of memory cells. The actual order of lower and upper pages may be interleaved and depends on the manufacturer. In many cases, the endurance of pages within a block 500 vary widely, and in some cases, this variation is particularly pronounced between lower pages (which may generally have a lower endurance) and upper pages (which may generally have a greater endurance).

As further shown in FIG. 5, each block 500 preferably includes page status information (PSI) 502, which indicates the status of each physical page in that block 500 as retired (i.e., no longer used to store user data) or non-retired (i.e., active or still usable to store user data). In various implementations, PSI 502 can be collected into a single data structure (e.g., a vector or table) within block 500, distributed within block 500 (e.g., as one or more bits of metadata appended to each physical page) and/or maintained elsewhere in data storage system 120. As one example, in the embodiment illustrated in FIG. 9 and discussed further below, the page status information of all blocks 500 in a NAND flash memory system 150 is collected in a system-level data structure, for example, a page status table (PST) 946 stored in GPP memory 134 or a flash controller memory 142.

Because the FTL implemented by data storage system 120 isolates the logical address space made available to host devices from the physical memory within NAND flash memory system 150, the size of NAND flash memory system 150 need not be equal to the size of the logical address space presented to host devices. In most embodiments it is beneficial to present a logical address space that is less than the total available physical memory (i.e., to over-provision NAND flash memory system 150). Over-provisioning in this manner ensures that physical memory resources are available when the logical address space is fully utilized, even given the presence of a certain amount of invalid data as described above. In addition to invalid data that has not yet been reclaimed the over-provisioned space can be used to ensure there is enough logical space, even given the presence of memory failures and the memory overhead entailed by the use of data protection schemes, such as Error Correcting Code (ECC), Cyclic Redundancy Check (CRC), and parity.

Figure 6A:
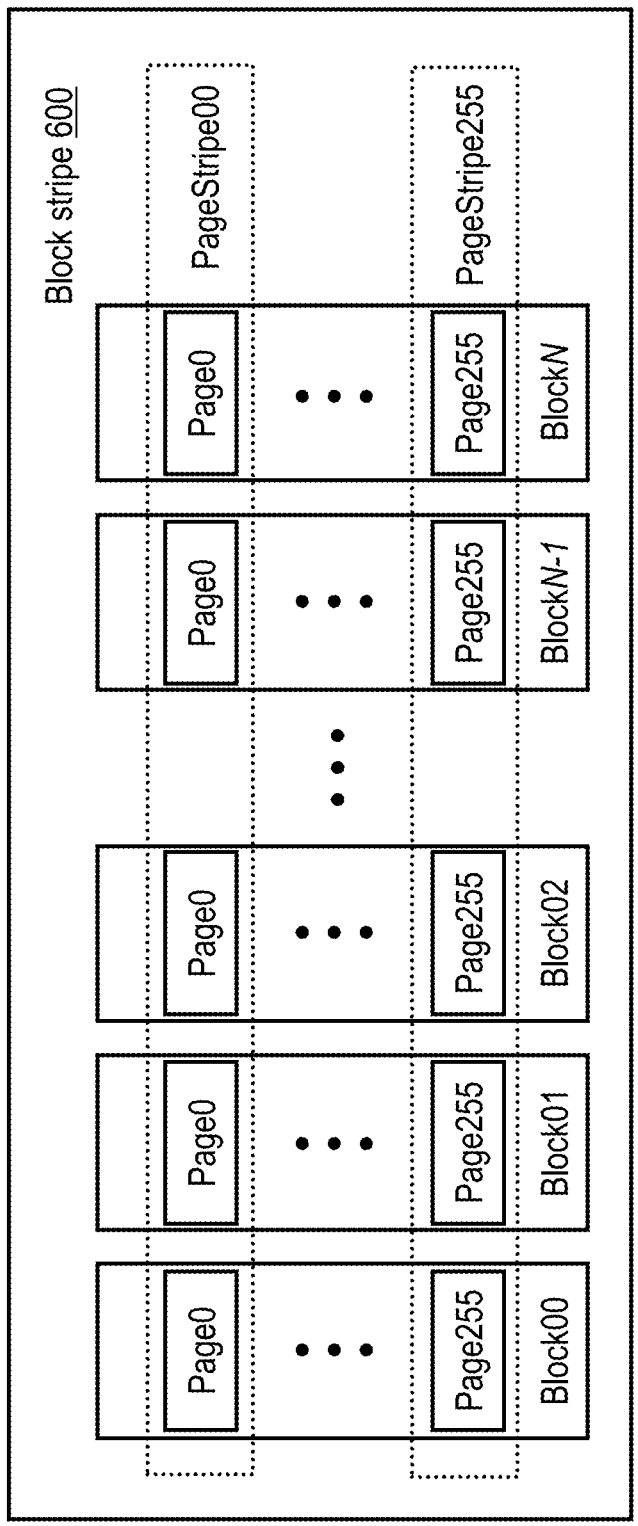
FIG. 6A depicts an exemplary implementation of a block stripe in accordance with the present disclosure.

In some embodiments, data is written to NAND flash memory system 150 one physical page at a time. In other embodiments in which more robust error recovery is desired, data is written to groups of associated physical pages of NAND flash memory system 150 referred to herein as "page stripes." In a disclosed embodiment, all pages of a page stripe are associated with different lanes to achieve high write bandwidth. Because in many implementations the smallest erase unit is a block, page stripes can be grouped into a block stripe as is shown in FIG. 6A, where each block in the block stripe is associated with a different lane. When a block stripe is built, any free block of a lane can be chosen, but preferably all blocks within the same block stripe have the same or similar health grade. Note that the block selection can be further restricted to be from the same plane, die, and/or chip enable. The lengths of the block stripes can and preferably do vary, but in one embodiment in which NAND flash memory system 150 includes 16 lanes, each block stripe includes between two and sixteen blocks, with each block coming from a different lane. Further details regarding the construction of block stripes of varying lengths can be found in U.S. Pat. Nos. 8,176,284; 8,176,360; 8,443,136; and 8,631,273, which are incorporated herein by reference in their entireties.

Figure 6B:
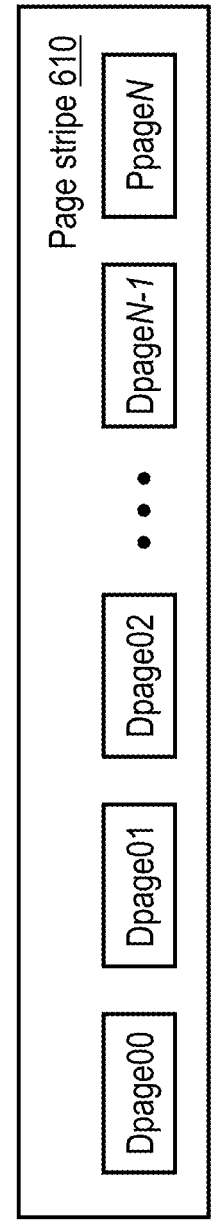
FIG. 6B depicts an exemplary implementation of a page stripe in accordance with the present disclosure.

Once a block from each lane has been selected and a block stripe is formed, page stripes are preferably formed from physical pages with the same page number from all blocks in the block stripe. While the lengths of the various page stripes stored into NAND flash memory system 150 can and preferably do vary, in one embodiment each page stripe includes one to fifteen data pages of write data (typically provided by a host device) and one additional page (a "data protection page") used to store data protection information for the write data. For example, FIG. 6B illustrates an exemplary page stripe 610 including N data pages (i.e., Dpage00 through DpageN-1) and one data protection page (i.e., PpageN). The data protection page can be placed on any lane of the page stripe containing a non-retired page, but typically is on the same lane for all page stripes of the same block stripe to minimize metadata information. The addition of a data protection page as illustrated requires that garbage collection be performed for all page stripes of the same block stripe at the same time. After garbage collection of the block stripe completes, the block stripe can be dissolved, and each block can be placed into the relevant ready-to-use (RTU) queue as explained below.

Figures 7, 8:
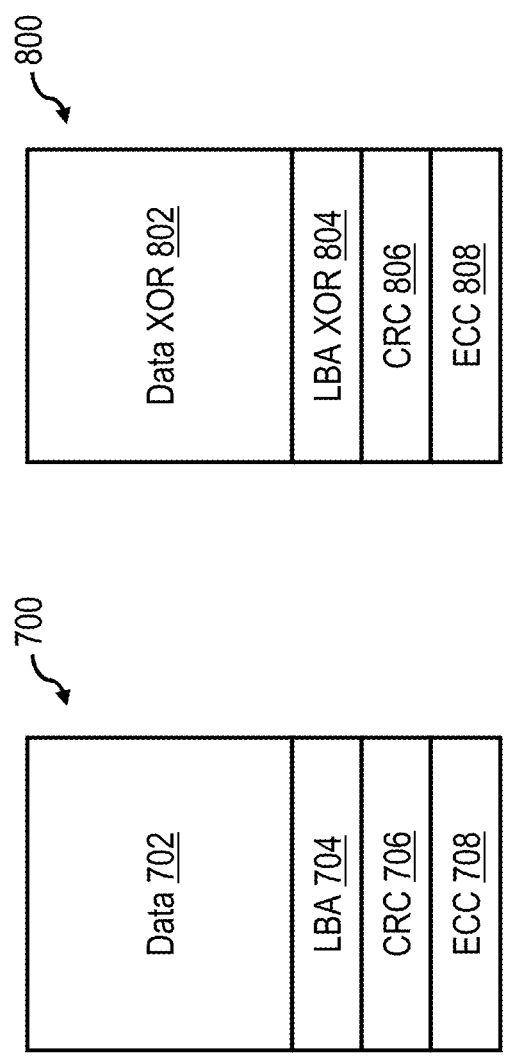
FIG. 7 illustrates an exemplary codeword stored in each data page in accordance with the present disclosure.
FIG. 8 depicts an exemplary codeword stored in each data protection page in accordance with the present disclosure.

FIG. 7 illustrates an exemplary format of a codeword stored in each data page within page stripe 610 of FIG. 6B. Typically, a positive integer number of codewords, for example, 2 or 3, are stored in each data page, but an alternative embodiment may also store a single codeword in a data page. In this example, each codeword 700 includes a data field 702, as well as additional fields for metadata describing the data page. Depending on the size of the codeword, the data field 702 holds data for one or more logical pages. In another embodiment it may also hold fractions of data of logical data pages. In the illustrated example, metadata fields include an LBA field 704 containing the LBAs stored in codeword 700, a CRC field 706 containing the CRC value computed for the combination of data field 702 and LBA field 704, and an ECC field 708 containing an ECC value calculated, in the illustrated example, from a combination of contents of data field 702, LBA field 704 and CRC field 706. In case data field 702 holds fractions of logical data pages, the LBA field 704 further holds information on which fractions of logical data pages are stored in the data field 702.

FIG. 8 depicts an exemplary format of a codeword in the data protection page of page stripe 610 of FIG. 6. In one embodiment, each data protection page stores a positive integer number of codewords, but an alternative embodiment a data protection page may store a single codeword. In the depicted example, data protection codeword 800 includes a data XOR field 802 that contains the bit-by-bit Exclusive OR (XOR) of the contents of the data fields 702 of the codewords 700 in page stripe 610. Data protection codeword 800 further includes an LBA XOR field 804 that contains the bit-by-bit XOR of the LBA fields 704 of the codewords 700 in page stripe 610. Data protection codeword 800 finally includes a CRC field 806 and ECC field 808 for respectively storing a CRC value and an ECC value for data protection codeword 800. Such a protection scheme is commonly referred to as RAID 5, since the parity field will not always be located on one particular flash plane. However, it should be appreciated that alternate data protection schemes such as Reed-Solomon can alternatively or additionally be used.

The formats for data pages and data protection pages described above protect data stored in a page stripe using multiple different data protection mechanisms. First, the use of the ECC bits in each codeword of a data page allows the correction of some number of bit errors within the codeword in a flash page. Depending on the ECC method used it may be possible to correct hundreds of bits or even thousands of bits within a NAND flash page. After ECC checking and correction is performed, the corrected CRC field is used to validate the corrected data. Used together, these two mechanisms allow for the correction of relatively benign errors and the detection of more serious errors using only local intra-page information. Should an uncorrectable error occur in a data page, for example, due to failure of the physical page utilized to store the data page, the contents of the data field and LBA field of the failing data page may be reconstructed from the other data pages and the data protection page for the page stripe.

While the physical memory locations in which the data pages and data protection page of a page stripe will vary within NAND flash memory system 150, in one embodiment the data pages and data protection page that comprise a given page stripe are preferably stored in physical memory locations selected to optimize the overall operation of the data storage system 120. For example, in some embodiments, the data pages and data protection page comprising a page stripe are stored such that different physical lanes are employed to store each of the data pages and data protection page. Such embodiments support efficient access to a page stripe because flash controller 140 can access all of the pages of data that comprise the page stripe simultaneously or nearly simultaneously. It should be noted that the assignment of pages to lanes need not be sequential (i.e., data pages can be stored in any lane in any order), and unless a page stripe is a full length page stripe (e.g., containing fifteen data pages and one data protection page), the lanes utilized to store the page stripe need not be adjacent.

Having described the general physical structure and operation of one exemplary embodiment of a data storage system 120, certain operational aspects of data storage system 120 are now described with reference to FIG. 9, which is a high level flow diagram of the flash management functions and data structures employed by GPP 132 and/or flash controllers 140 in accordance with one embodiment.

As noted above, data storage system 120 does not generally allow external devices to directly address and/or access the physical memory locations within NAND flash memory systems 150. Instead, data storage system 120 is generally configured to present a single contiguous logical address space to the external devices, thus allowing host devices to read and write data to and from LBAs within the logical address space while permitting flash controllers 140 and GPP 132 to control where the data that is associated with the various LBAs actually resides in the physical memory locations comprising NAND flash memory systems 150. In this manner, performance and longevity of NAND flash memory systems 150 can be intelligently managed and optimized. In the illustrated embodiment, each flash controller 140 manages the logical-to-physical translation using a logical-to-physical translation data structure, such as logical-to-physical translation (LPT) table 900, which can be stored in the associated flash controller memory 142.

Flash management code running on the GPP 132 tracks erased blocks of NAND flash memory system 150 that are ready to be used in ready-to-use (RTU) queues 906, which may be stored, for example, in GPP memory 134. In the depicted embodiment, management code running on the GPP 132 preferably maintains one or more RTU queues 906 per channel, and an identifier of each erased block that is to be reused is enqueued in one of the RTU queues 906 corresponding to its channel. For example, in one embodiment, RTU queues 906 include, for each channel, a respective RTU queue 906 for each of a plurality of block health grades. In various implementations, between 2 and 8 RTU queues 906 per lane (and a corresponding number of block health grades) have been found to be sufficient.

A build block stripes function 920 performed by flash management code running on the GPP 132 constructs new block stripes for storing data and associated parity information from the erased blocks enqueued in RTU queues 906. As noted above with reference to FIG. 6A, block stripes are preferably formed of blocks of the same or similar health (i.e., expected remaining useful life) residing in different channels, meaning that build block stripes function 920 can conveniently construct a block stripe by drawing each block of the new block stripe from corresponding RTU queues 906 of different channels. The new block stripe is then queued to flash controller 140 for data placement.

In response to a write IOP received from a host, such as a processor system 102, a data placement function 910 of flash controller 140 determines by reference to LPT table 900 whether the target LBA(s) indicated in the write request is/are currently mapped to physical memory page(s) in NAND flash memory system 150 and, if so, changes the status of each data page currently associated with a target LBA to indicate that it is no longer valid. In addition, data placement function 910 allocates a page stripe if necessary to store the write data of the write IOP and any non-updated data (i.e., in case the write request is smaller than a logical page, there is still valid data which needs to be handled in a read-modify-write manner) from an existing page stripe, if any, targeted by the write IOP, and/or stores the write data of the write IOP and any non-updated (i.e., still valid) data from an existing page stripe, if any, targeted by the write IOP to an already allocated page stripe which has free space left. The page stripe may be allocated from either a block stripe already allocated to hold data or from a new block stripe built by build block stripes function 920. In a preferred embodiment, the page stripe allocation can be based on the health of the blocks available for allocation and the "heat" (i.e., estimated or measured write access frequency) of the LBA of the write data. Data placement function 910 then writes the write data, associated metadata (e.g., CRC and ECC values) for each codeword in each page of the page stripe, and parity information for the page stripe in the allocated page stripe. The addition of associated metadata and parity information can be done as soon as enough host data has been placed into the page stripe. Flash controller 140 also updates LPT table 900 to associate the physical page(s) utilized to store the write data with the LBA(s) indicated by the host device. Thereafter, flash controller 140 can access the data to service host read IOPs by reference to LPT table 900 as further illustrated in FIG. 9.

Once all pages in a block stripe have been written, flash controller 140 places the block stripe into one of occupied block queues 902, which flash management code running on the GPP 132 utilizes to facilitate garbage collection. As noted above, through the write process, pages are invalidated, and therefore portions of the NAND flash memory system 150 become unused. The associated flash controller 140 (and/or GPP 132) eventually needs to reclaim this space through garbage collection performed by a garbage collector 912. Garbage collector 912 selects particular block stripes for garbage collection based on a number of factors including, for example, the health of the blocks within the block stripes and how much of the data within the erase blocks is invalid. In various embodiments, garbage collector 912 attempts to regroup data associated with a given stream (e.g., data of a particular temperature) in a same LEB to reduce garbage collection related write amplification. In the illustrated example, garbage collection is performed on entire block stripes, and flash management code running on GPP 132 logs the block stripes ready to be recycled in a relocation queue 904, which can conveniently be implemented in the associated flash controller memory 142 or GPP memory 134. It should be appreciated that garbage collection, according to the present disclosure, may be performed on garbage collection units other than block stripes.

The flash management functions performed by GPP 132 or flash controller 140 additionally include a relocation function 914 that relocates the still valid data held in block stripes enqueued in relocation queue 904. To relocate such data, relocation function 914 issues relocation write requests to data placement function 910 to request that the data of the old block stripe be written to a new block stripe in NAND flash memory system 150. In addition, relocation function 914 updates LPT table 900 to remove the current association between the logical and physical addresses of the data. Once all still valid data has been moved from the old block stripe, the old block stripe is passed to dissolve block stripes function 916, which decomposes the old block stripe into its constituent blocks, thus disassociating the blocks. Flash controller 140 then erases each of the blocks formerly forming the dissolved block stripe and increments an associated program/erase (P/E) cycle count for the block in P/E cycle counts 944. Based on the health metrics of each erased block, each erased block is either retired (i.e., no longer used to store user data) by a block retirement function 918 among the flash management functions executed on GPP 132, or alternatively, prepared for reuse by placing the block's identifier on the appropriate ready-to-use (RTU) queue 906 in the associated GPP memory 134.

Figure 9:
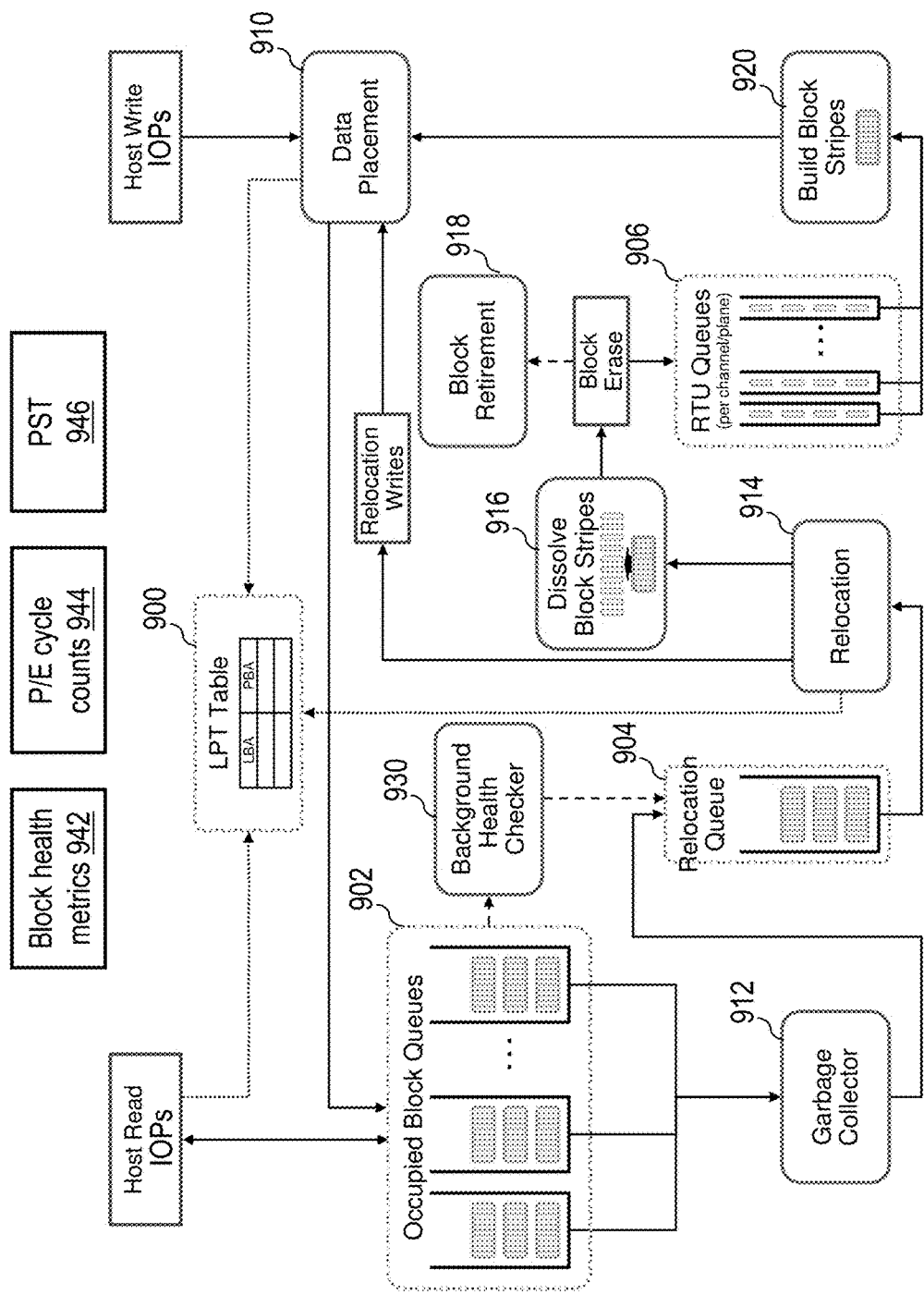
FIG. 9 is a high level flow diagram of the flash management functions and data structures employed by a flash controller in accordance with one embodiment.

As further shown in FIG. 9, flash management functions executed on GPP 132 include a background health checker 930. Background health checker 930, which operates independently of the demand read and write IOPs of hosts such as processor systems 102, continuously determines one or more block health metrics 942 for blocks belonging to block stripes recorded in occupied block queues 902. Based on the one or more of the block health metrics 942, background health checker 930 may place block stripes on relocation queue 904 for handling by relocation function 914.

Figure 10:
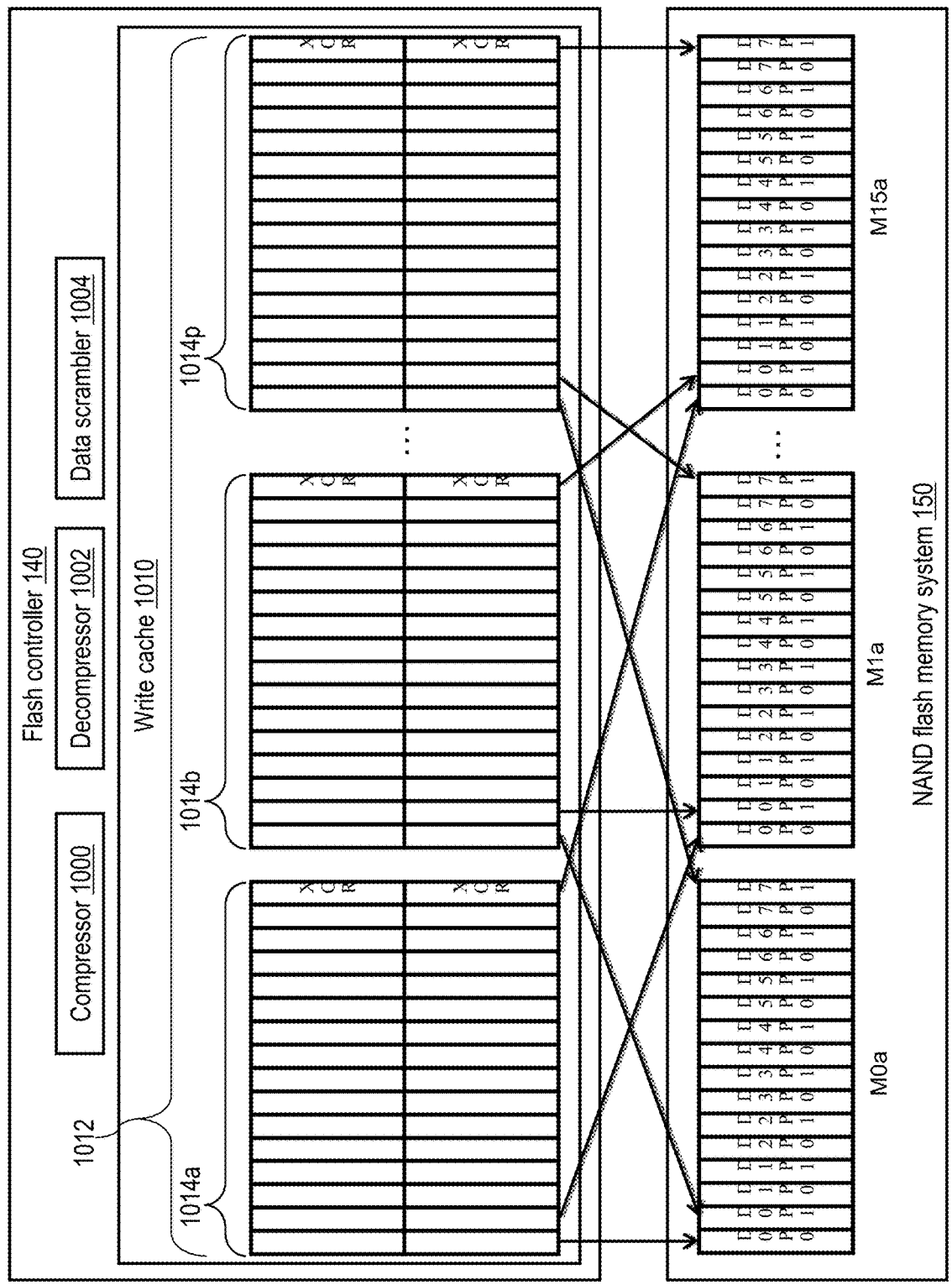
FIG. 10 depicts a more detailed view of an exemplary flash controller in accordance with one embodiment.

Referring now to FIG. 10, there is depicted a more detailed view of a flash controller 140 in accordance with one embodiment. In this embodiment, flash controller 140 is configured (e.g., in hardware, firmware, software or some combination thereof) to support retirement of memory in flash memory modules M0a, M0b, M1a, M1b, . . . , M1a, and M15b of a NAND flash memory system 150, for example, on a page-by-page basis rather than on a block-by-block basis. Flash controller 140 may be further configured to retire a physical page of memory while still keeping active other physical page(s) sharing a common set of multiple-bit memory cells with the retired physical page.

In the illustrated embodiment, flash controller 140 includes a compressor 1000 that selectively applies one or more data compression algorithms to data written to the associated NAND flash memory system 150, a decompressor 1002 that decompresses compressed data read from NAND flash memory system 150, and a data scrambler 1004. Flash controller 140 utilizes data scrambler 1004 to apply a predetermined data scrambling (i.e., randomization) pattern to data written to NAND flash memory 150 in order to improve endurance and mitigate cell-to-cell interference.

As further illustrated in FIG. 10, flash controller 140 includes a write cache 1010. Write cache 1010 includes storage for one or more cache lines 1012 for buffering write data in anticipation of writing the data to NAND flash memory system 150. In the illustrated embodiment, each cache line 1012 includes multiple (e.g., 16) segments 1014a-1014p, each providing storage for a respective page stripe of up to sixteen data pages (a maximum of fifteen data pages and one data protection page). As shown, for ease of implementation, it is preferred if flash controller 140 writes each page buffered in a given segment 1014 of cache line 1012 to the corresponding die index, plane index, and physical page index in each of sixteen flash memory modules. Thus, for example, flash controller 140 writes the data pages from segment 1014a to a first physical page (e.g., Page23) in each of flash memory modules M0a-M15a, writes the data pages from segment 1014b to a second physical page in each of flash memory modules M0a-M15a, and writes the data pages from segment 1014p to a sixteenth physical page in each of flash memory modules M0a-M15a.

Figure 11:
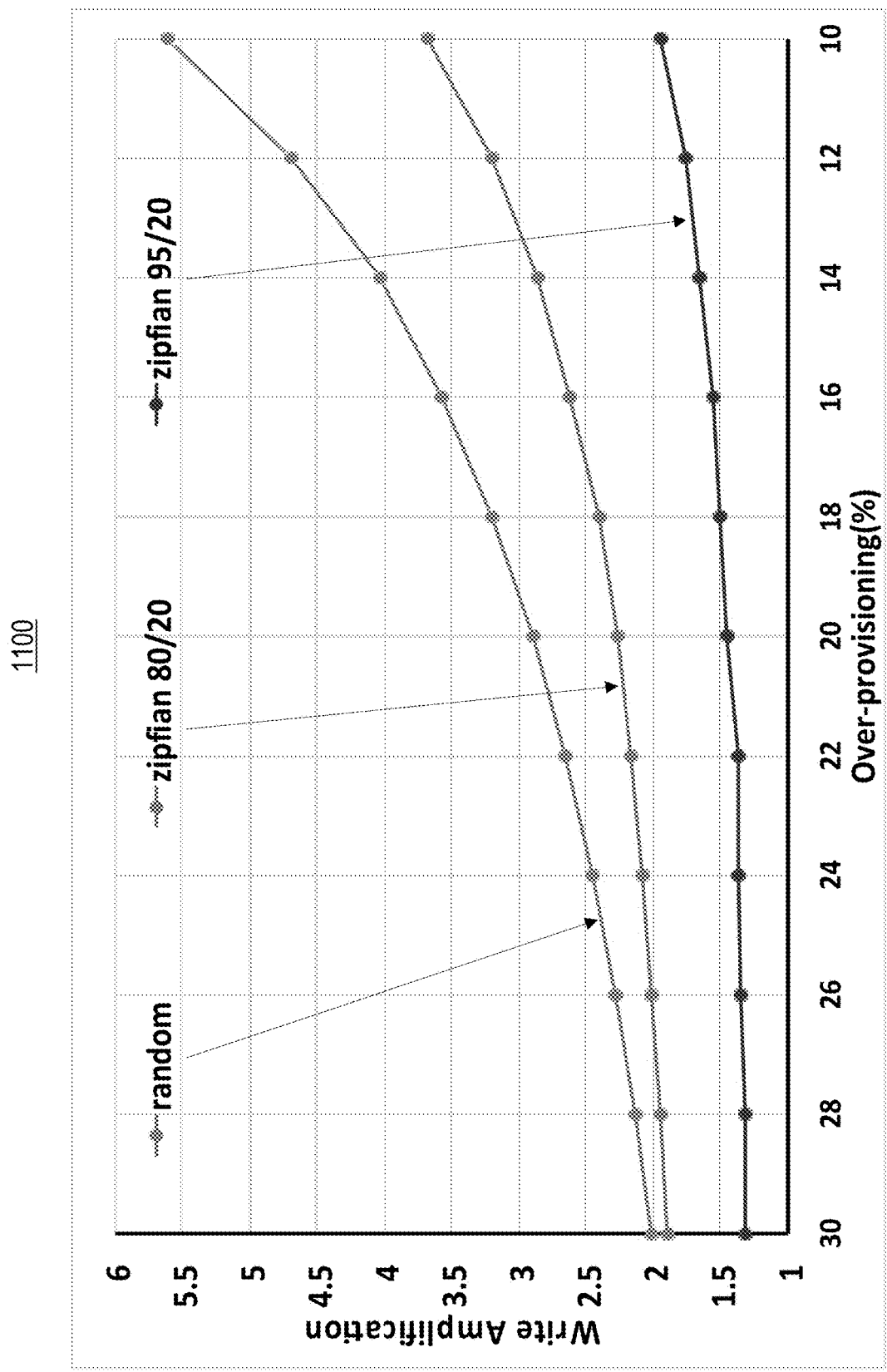
FIG. 11 is a graph that depicts write amplification with respect to over-provisioning space for three simulated workloads associated with a storage system that have different write distributions.

According to one or more embodiments of the present disclosure, the fact that write amplification is correlated with an amount of over-provisioning space available is exploited. The relation between write amplification and over-provisioning space for three simulated workloads without compression is depicted in FIG. 11. In FIG. 11, write amplification is plotted with respect to over-provisioning space of physical capacity for workloads having different write distributions (i.e., a uniform random distribution, a Zipfian 80/20 distribution, and a Zipfian 95/20 distribution). The results depicted are for a garbage collection policy similar to the ones described in U.S. patent application Ser. Nos. 14/497,887, 14/497,243, and 14/578,195, which disclose a garbage collector employing a greedy policy augmented with heat segregation and recurring pattern detection. For uniform random write workloads, the greedy garbage collection policy has been shown to be optimal with respect to the write amplification. The techniques presented in this disclosure, however, are orthogonal to the garbage collection policy used. As is illustrated, a uniform random distribution requires a higher over-provisioning percentage to reach a target write amplification than Zipfian 80/20 and Zipfian 95/20 distributions. Similarly, a Zipfian 80/20 distribution requires a higher over-provisioning percentage to reach a target write amplification than a Zipfian 95/20 distribution.

When a flash controller compresses data before writing data to flash the flash controller reduces the amount of data written to flash by an average compression ratio. Compressing data directly impacts the amount of data written to flash (DataWrittenToFlash) and correspondingly reduces write amplification, as compared to write amplification that would be associated with associated uncompressed data. Write amplification (WA) in the presence of compression is a function of the compression ratio (CRatio) as follows:

WA=DataWrittenToFlash/DataWrittenByUser

WA(CRatio)=(UncompressedDataWrittenToFlash/ CRatio)/DataWrittenByUser

Figure 12:
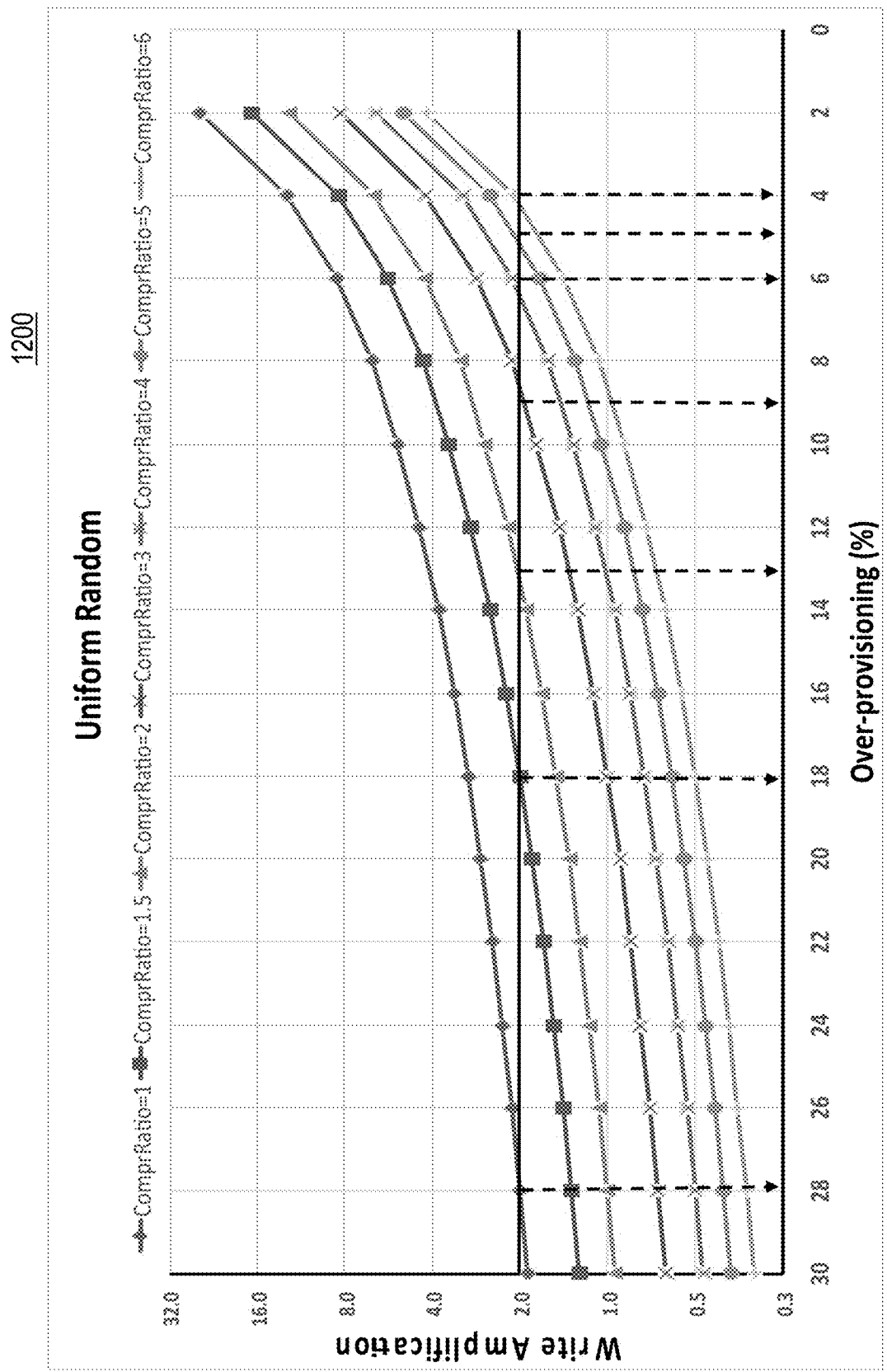
FIG. 12 is a graph depicting write amplification with respect to over-provisioning space for six simulated workloads associated with a storage system that have uniform random write distributions with different compression ratios.

With reference to FIG. 12, for an exemplary target worst-case write amplification of two (2), for a workload having a uniform random write distribution, over-provisioning can be dynamically adjusted based on an average compression ratio. Over-provisioning-average compression ratio pairs taken from graph 1200 of FIG. 12 to achieve a write amplification of two (2) are as follows:

| Over-provisioning (%) | Average Compression Ratio |
|---|---|
| 28 | 1 |
| 18 | 1.5 |
| 13 | 2 |
| 9 | 3 |
| 6 | 4 |
| 5 | 5 |
| 4 | 6 |

The gradual decrease in over-provisioning as an average compression ratio increases delays the point at which a flash controller issues a low space warning or an out-of-space report in a thin provisioned environment. Delaying the point at which a flash controller issues an out-of-space report effectively allows more user writes to be accommodated by a flash controller before the flash controller reports storage as being full. For example, in a storage system with a 100 terabyte (TB) capacity flash device with an average compression ratio of three (3) and a target worst case write amplification of two (2), a user may use nineteen (19) percent more physical capacity (28−9=19), as compared to the case of an over-provisioning percentage of twenty-eight (28) percent at a compression ratio of one (1). In other words, assuming a storage system has a fixed over-provisioning ratio of 28 percent because it was designed for an uncompressible workload at the target write amplification of two, in reality however the workload is compressible with compression ratio 3, only 216 TB (3·(100−28)=216) of logical data can be stored. At the same time, write amplification would be extremely low (i.e., ~0.75). However, when overprovisioning is dynamically adapted the additional nineteen (19) percent of 100 TB translates to 19 TB of additional physical capacity, which corresponds to 57 TB of uncompressed user data for a compression ratio of three (3) totaling in 273 TB uncompressed user data that can be stored at the targeted worst case performance dictated by the write amplification ratio of two.

It should be appreciated that when an average compression ratio decreases over time, over-provisioning space has to increase in order to maintain the same write amplification. In the case that not all physical capacity is in use and enough free space is available to accommodate the increase in over-provisioning space, then increasing over-provisioning space is trivial. In the case that all physical capacity is in use then increasing the over-provisioning is not possible and at that point the flash device simply initiates an out-of-space report when a new user write is received (essentially switching to read-only mode). This behavior exists even if dynamic adjustment of over-provisioning based on an average compression ratio is not implemented. In the event a storage system implements more than one data reduction technique, a total data reduction ratio may be employed to determine a dynamic over-provisioning operation point. For example, assuming both data compression and data deduplication are implemented by a storage system a data reduction ratio may determined by multiplying a deduplication ratio (DRatio) by a compression ratio (e.g., Data reduction ratio=DRatio*CRatio).

According to one or more embodiments of the present disclosure, an available over-provisioning space is dynamically adjusted based on a dynamic data reduction ratio (e.g., data compression ratio and/or data deduplication ratio) so that a desired metric (e.g., write amplification) can be guaranteed. A flash vendor may, for example, want to target a worst case write amplification so that the vendor can make certain performance and endurance guarantees. A write workload that follows a uniform random distribution is typically considered the worst case in terms of write amplification. As mentioned above, graph 1200 of FIG. 12 depicts simulated steady-state write amplification with respect to available over-provisioning space for a uniform random write distribution for different average compression ratios (i.e., 1, 1.5, 2, 3, 4, 5, and 6).

Figure 13:
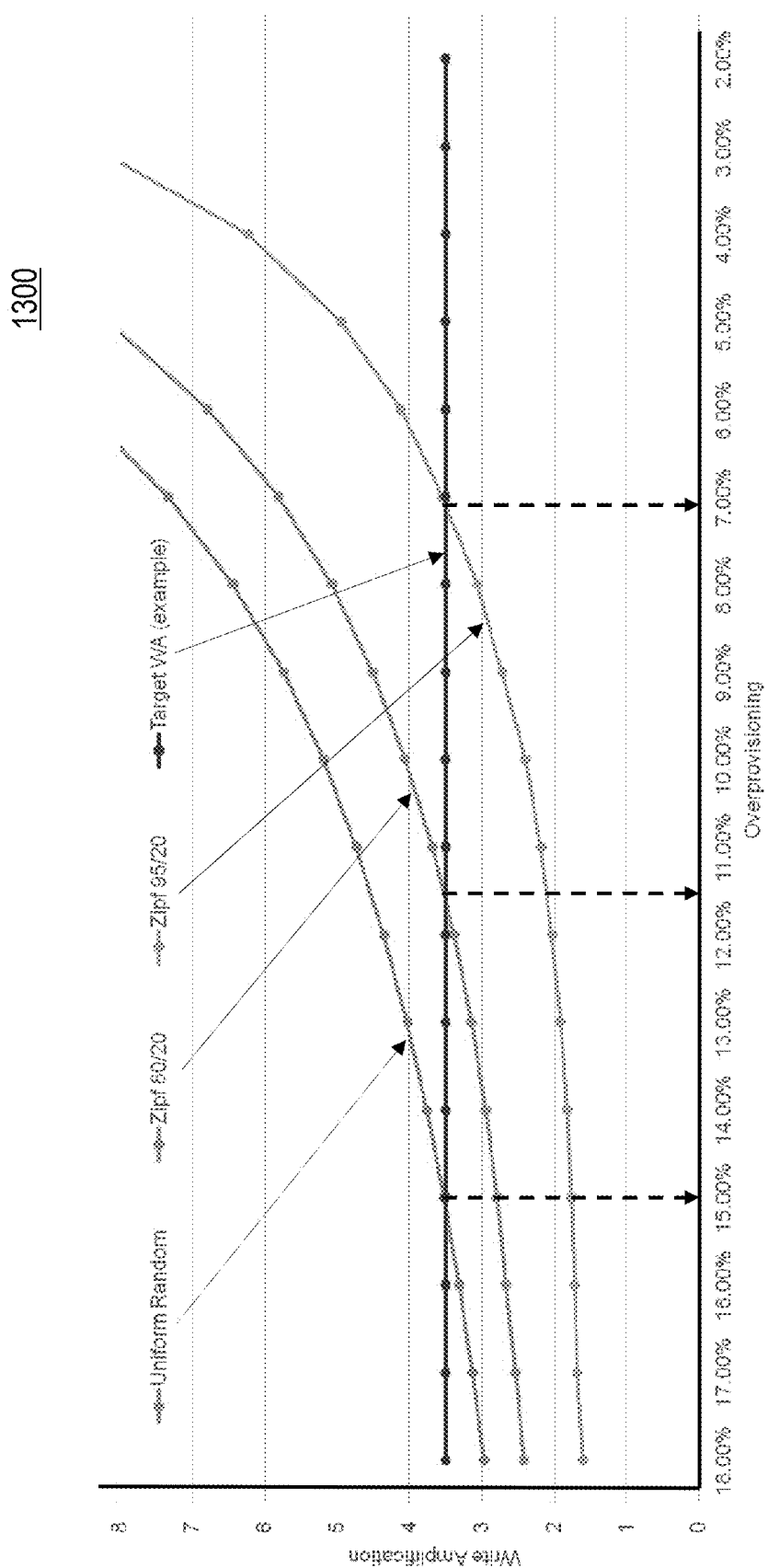
FIG. 13 is a graph depicting write amplification with respect to over-provisioning space for three simulated workloads associated with a storage system that have different write distributions and a compression ratio of one.

With reference to FIG. 13, graph 1300 depicts write amplification with respect to over-provisioning space for three simulated workloads (i.e., uniform random, Zipfian 80/20, and Zipfian 95/20) associated with a storage system that have different write distributions and a compression ratio of one. As is illustrated in graph 1300 of FIG. 13, a uniform random distribution requires a higher over-provisioning percentage (about fifteen (15) percent) to reach a target write amplification (about 3.5 in this example) than Zipfian 80/20 (about eleven and one-half (11.5) percent) and Zipfian 95/20 distributions (about seven (7) percent).

Figure 14:
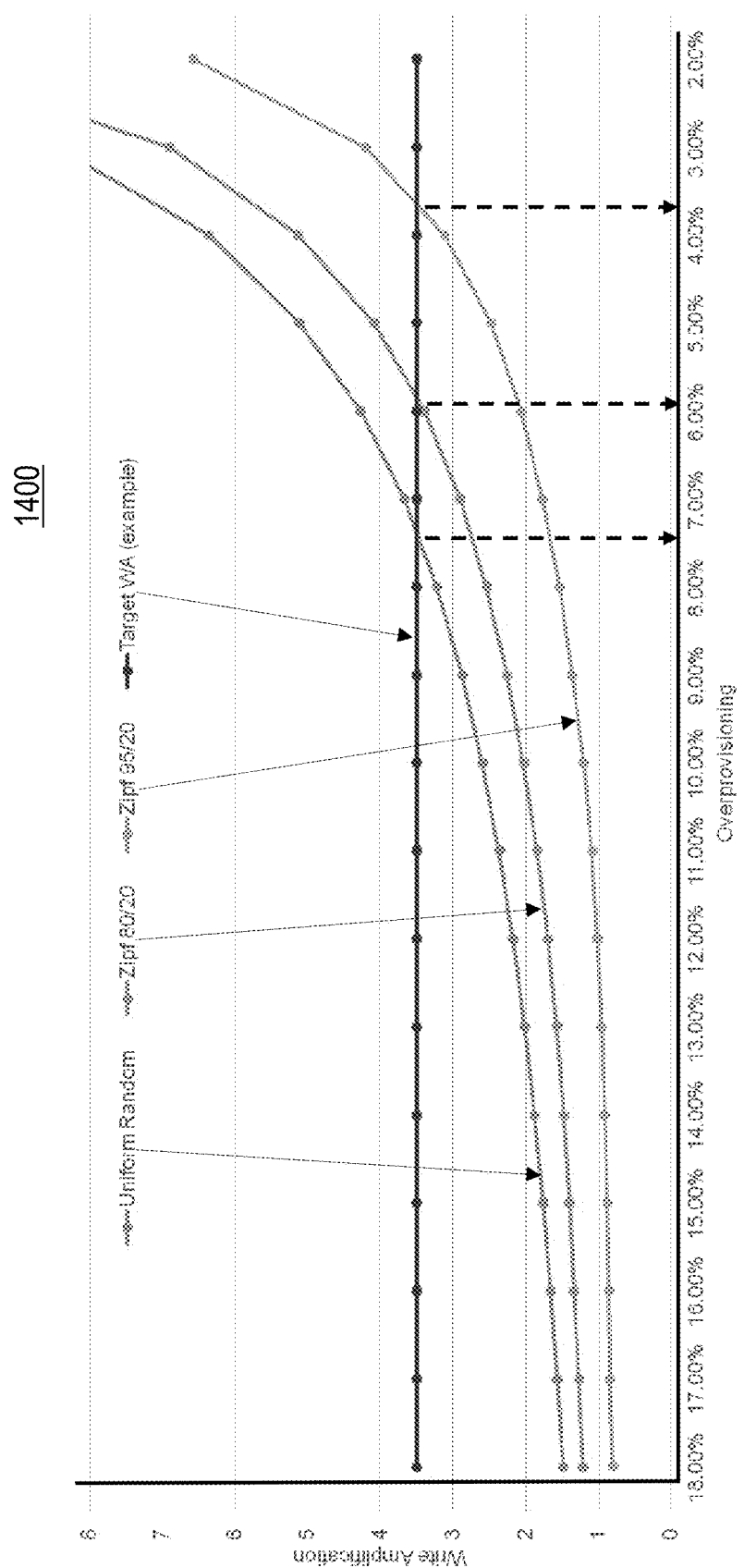
FIG. 14 is a graph depicting write amplification with respect to over-provisioning space for three simulated workloads associated with a storage system that have different write distributions and a compression ratio of two.

With reference to FIG. 14, a graph 1400 depicts write amplification with respect to over-provisioning space for three simulated workloads (i.e., uniform random, Zipfian 80/20, and Zipfian 95/20) associated with a storage system that have different write distributions and a compression ratio of two. As is illustrated in graph 1400 of FIG. 14, a uniform random distribution requires a higher over-provisioning percentage (about seven and one-half (7.5) percent) to reach a target write amplification than Zipfian 80/20 (about six (6) percent) and Zipfian 95/20 distributions (about three and two-thirds (3.66) percent).

Figure 15:
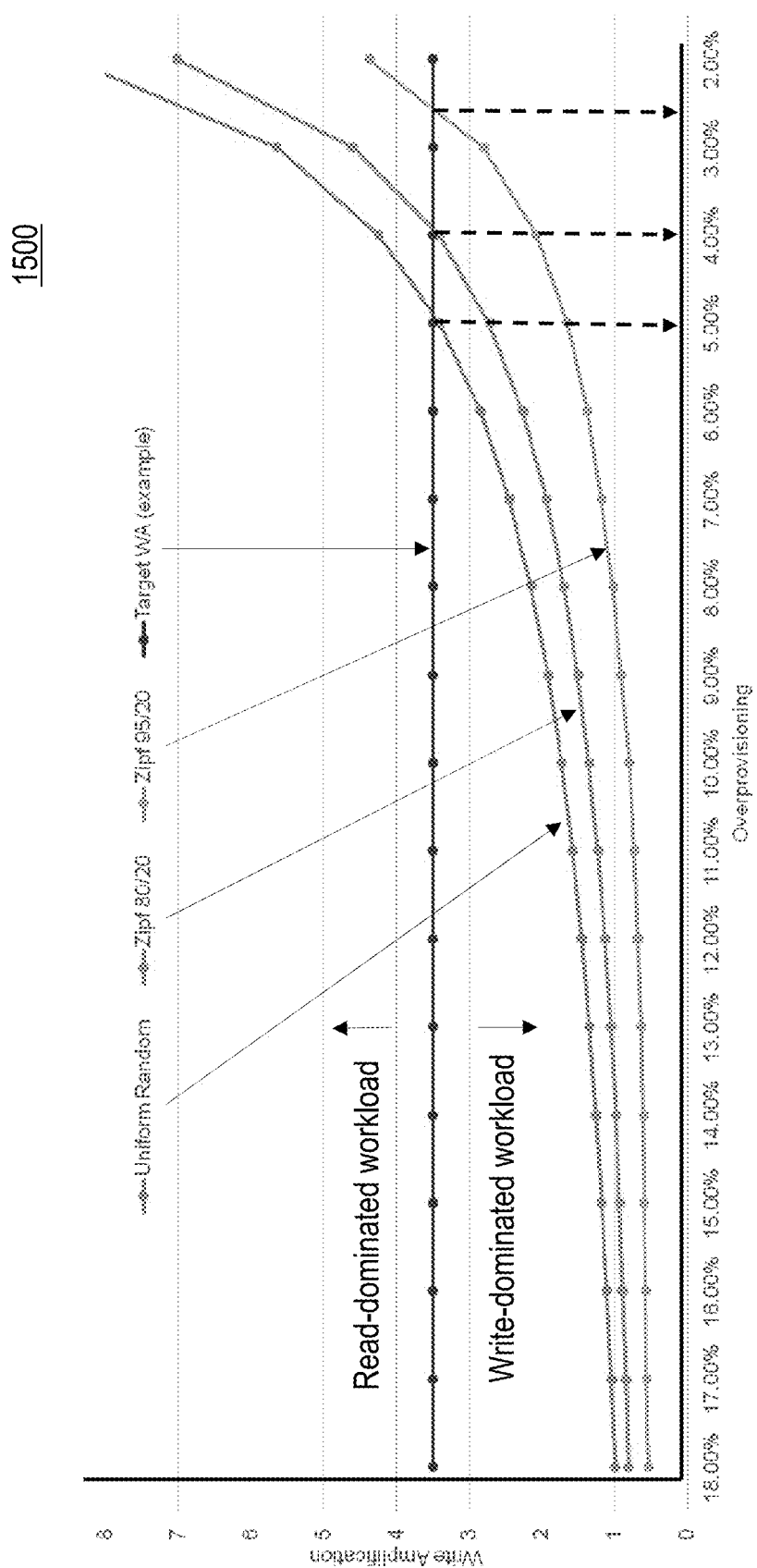
FIG. 15 is a graph depicting write amplification with respect to over-provisioning space for three simulated workloads associated with a storage system that have different write distributions and a compression ratio of three.

With reference to FIG. 15, a graph 1500 depicting write amplification with respect to over-provisioning space for three simulated workloads associated with a storage system that have different write distributions and a compression ratio of three. As is illustrated in graph 1500 of FIG. 15, a uniform random distribution requires a higher over-provisioning percentage (about five (5) percent) to reach a target write amplification than Zipfian 80/20 (about four (4) percent) and Zipfian 95/20 distributions (about two and one-half (2.5) percent). It should be appreciated that when reads dominate during a unit of time that higher write amplification can be allowed, as less data is required to be relocated.

Similarly, it should be appreciated that when writes dominate during a unit of time that lower write amplification may be required, as more data may be required to be relocated. Accordingly, a target write amplification may be adjusted based one whether a workload is a read-dominated workload or a write-dominated workload.

Figure 16:
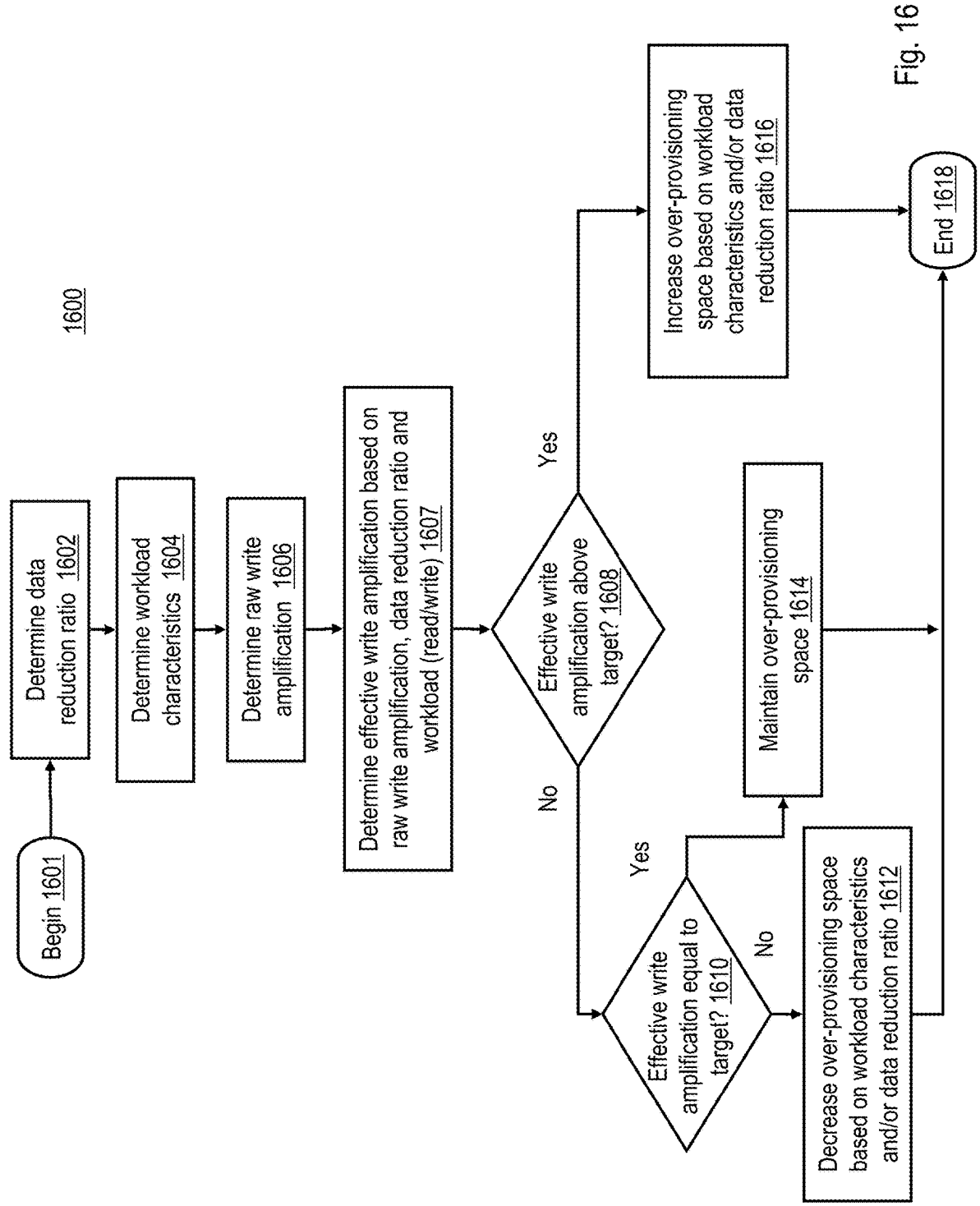
FIG. 16 is a high level logical flowchart of an exemplary process that performs over-provisioning for a storage system in accordance with one embodiment of the present disclosure.

With reference to FIG. 16, an exemplary process 1600 is illustrated that may adjust over-provisioning space for a storage system to achieve a target write amplification in accordance with an embodiment of the present disclosure. Process 1600 may, for example, be periodically performed by, for example, a thin provisioning manager (not specifically shown) executing on flash controller 140 or another component. For example, process 1600 may be executed every 'X' IOPs or as a background process. In one or more embodiments, process 1600 is initiated periodically in block 1601. Next, in block 1602, flash controller 140 determines a data reduction ratio. The data reduction ratio may be based on a dynamic data compression ratio and/or a dynamic data deduplication ratio experienced by storage system 120. Then, in block 1604, flash controller 140 determines current workload characteristics (e.g., a dynamic read/write ratio, a dynamic write amplification, and a dynamic write access distribution) for storage system 120. Next, in block 1606, flash controller 140 determines a current raw write amplification for storage system 120 (i.e., the ratio of (relocates+user writes)/user writes).

Then, in block 1607, flash controller 140 determines an effective current write amplification based on the previously calculated raw write amplification, data reduction ratio, and/or workload characteristics. More specifically, the effective current write amplification is a multiplication of the raw write amplification with one over the data reduction ratio and the ratio of writes with respect to the total number of IOPs (writes/(reads/writes), taking into account the write overhead in terms of internal IOPs for relocations). For example, an effective write amplification (EffectiveWA) may be derived as follows:

EffectiveWA=(RawWA)/DataReductionRatio*((UserWrites+Relocates)/(UserWrites+Relocates+Reads)=(RawWA)/DataReductionRatio*((UserWrites+UserWrites*(RawWA−1)*2)/(UserWrites+UserWrites*(RawWA−1)*2+Reads)

As one example, for a raw write amplification of 4.0, data reduction ratio of 4.0, and read/write ratio of 3/1, the effective write amplification would be 0.7 (i.e., 4.0*1/4.0*(1+(4−1)*2)/(3+1+(4−1)*2)=0.70). Each relocation operation requires an extra read and an extra write, hence the multiplication factor of two (2) in the previous equation. In alternative embodiments, additional weighting factors may be added to the equation or parts may also be omitted (e.g., reads). As one example, one or more workload characteristics may be exclusively used to determine over-provisioning space. It should be noted that any of the values determined in blocks 1602, 1604, 1606, and 1607 may result from instantaneous measurements, averages from a series of measurements (e.g., weighted moving averages) or similar approaches that are known by one skilled in the art.

Then, in decision block 1608, flash controller 140 determines whether a current effective write amplification for storage system 120 is above a target write amplification. In response to the current write amplification for storage system 120 being above a target write amplification in block 1608, control transfers to block 1616. In block 1616, flash controller 140 increases over-provisioning space (e.g., by two (2) percent) based on the data reduction ratio and/or the workload characteristics (e.g., read/write ratio and write access distribution) to provide more space for garbage collection. From block 1616 control transfers to block 1618, where process 1600 terminates. In response to the current write amplification for storage system 120 not being above the target write amplification in block 1608, control transfers to decision block 1610.

In block 1610, flash controller 140 determines whether a current effective write amplification is equal to a target write amplification. In response to the current effective write amplification being equal to the target write amplification control transfers from block 1610 to block 1614. In block 1614, flash controller 140 maintains over-provisioning space at a current level. From block 1614 control transfers to block 1618. In response to the current effective write amplification being above the target write amplification in block 1610, control transfers to block 1612. In block 1612, flash controller 140 decreases over-provisioning space from a current level based on the current data reduction ratio and/or workload characteristics (e.g., by one (1) percent) to provide additional user space. From block 1612 control transfers to block 1618.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude transmission media per se, transitory propagating signals per se, and forms of energy per se.

In addition, although embodiments have been described that include use of a NAND flash memory, it should be appreciated that embodiments of the present invention can also be used with other types of non-volatile random access memory (NVRAM) including, for example, phase-change memory (PCM) and combinations thereof.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of adapting over-provisioning space in a storage system, comprising:

determining, by a controller, a data reduction ratio in the storage system, wherein the data reduction ratio is based on a product of a dynamic data compression ratio and a dynamic data deduplication ratio experienced by the storage system;

determining, by the controller, one or more workload characteristics in the storage system, wherein the workload characteristics and the data reduction ratio indicate a current workload type;

determining, by the controller, a current raw write amplification for the storage system;

determining, by the controller, an effective current write amplification for the storage system based on the current raw write amplification, the data reduction ratio, and the workload characteristics;

adjusting by the controller, based on a relationship of the effective current write amplification to a target write amplification for the storage system, over-provisioning space in the storage system to achieve the target write amplification for the storage system and thereby improve performance of the storage system by changing user capacity without reducing user access to the storage system; and adjusting by the controller, based on the current workload type, a value of the target write amplification, wherein the value of the target write amplification is increased for read-dominated workloads and is decreased for write-dominated workloads.

2. The method of claim 1, wherein the workload characteristics include one or more of a dynamic read/write ratio, a dynamic write amplification, and a dynamic write access distribution experienced by the storage system.

3. The method of claim 1, wherein the storage system is a thin provisioned storage system.

4. A storage system, comprising:
a flash controller memory; and
a flash controller coupled to the flash controller memory, wherein the flash controller is configured to:
determine a data reduction ratio in the storage system, wherein the data reduction ratio is based on a product of a dynamic data compression ratio and a dynamic data deduplication ratio experienced by the storage system;
determine one or more workload characteristics in the storage system, wherein the workload characteristics and the data reduction ratio indicate a current workload type;
determine a current raw write amplification for the storage system;
determine an effective current write amplification for the storage system based on the current raw write amplification, the data reduction ratio, and the workload characteristics;
adjust, based on a relationship of the effective current write amplification to a target write amplification for the storage system, over-provisioning space in the storage system to achieve the target write amplification for the storage system and thereby improve performance of the storage system by changing user capacity without reducing user access to the storage system; and
adjust, based on the current workload type, a value of the target write amplification, wherein the value of the target write amplification is increased for read-dominated workloads and is decreased for write-dominated workloads.

5. The storage system of claim 4, wherein the workload characteristics include one or more of a dynamic read/write ratio, a dynamic write amplification, and a dynamic write access distribution experienced by the storage system.

6. The storage system of claim 4, wherein the storage system is a thin provisioned storage system.

7. A computer program product, the computer program product comprising a computer readable storage medium having program instructions embodied therewith, the program instructions executable by a storage system to cause the storage system to:
determine a data reduction ratio in the storage system, wherein the data reduction ratio is based on a product of a dynamic data compression ratio and a dynamic data deduplication ratio experienced by the storage system;
determine one or more workload characteristics in the storage system, wherein the workload characteristics and the data reduction ratio indicate a current workload type;
determine a current raw write amplification for the storage system;
determine an effective current write amplification for the storage system based on the current raw write amplification, the data reduction ratio, and the workload characteristics;
adjust, based on a relationship of the effective current write amplification to a target write amplification for the storage system, over-provisioning space in the storage system to achieve the target write amplification for the storage system and thereby improve performance of the storage system by changing user capacity without reducing user access to the storage system; and
adjust, based on the current workload type, a value of the target write amplification, wherein the value of the target write amplification is increased for read-dominated workloads and is decreased for write-dominated workloads.

8. The program product of claim 7, wherein the workload characteristics include one or more of a dynamic read/write ratio, a dynamic write amplification, and a dynamic write access distribution experienced by the storage system.

9. The program product of claim 7, wherein the storage system is a thin provisioned storage system.

* * * * *